(12) United States Patent
Dyer et al.

(10) Patent No.: US 10,110,056 B2
(45) Date of Patent: Oct. 23, 2018

(54) ENERGY BANKING SYSTEM AND METHOD USING RAPIDLY RECHARGEABLE BATTERIES

(71) Applicant: LIGHTENING ENERGY, Dover, NJ (US)

(72) Inventors: Christopher K. Dyer, Madison, NJ (US); Michael L. Epstein, Bedminster, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 691 days.

(21) Appl. No.: 14/377,081

(22) PCT Filed: Feb. 4, 2013

(86) PCT No.: PCT/US2013/024598
§ 371 (c)(1),
(2) Date: Aug. 6, 2014

(87) PCT Pub. No.: WO2013/122766
PCT Pub. Date: Aug. 22, 2013

(65) Prior Publication Data
US 2015/0295452 A1    Oct. 15, 2015

Related U.S. Application Data

(60) Provisional application No. 61/599,768, filed on Feb. 16, 2012.

(51) Int. Cl.
*H02J 1/10*    (2006.01)
*H02J 3/38*    (2006.01)
(Continued)

(52) U.S. Cl.
CPC ............. *H02J 9/06* (2013.01); *H02J 7/007* (2013.01); *H02J 7/34* (2013.01)

(58) Field of Classification Search
CPC ...... G06F 1/32; G06F 1/28; G06F 1/26; H02J 7/00; H02J 17/00; H02J 5/00; H02J 1/00;
(Continued)

(56) References Cited

U.S. PATENT DOCUMENTS 3,844,841 A    10/1974    Baker
4,415,847 A    11/1983    Galloway
(Continued)

FOREIGN PATENT DOCUMENTS

CN    1949559    4/2007
DE    4408961 C1    3/1995
(Continued)

*Primary Examiner* — Rexford Barnie
*Assistant Examiner* — Jagdeep Dhillon
(74) *Attorney, Agent, or Firm* — Davidson, Davidson & Kappel, LLC

(57) ABSTRACT

A system for banking energy is provided. The system includes a rechargeable battery and a controller selectively controlling a supply of electricity from the rechargeable battery and from at least one additional energy source to a plurality of electrically powered devices of a facility. The controller directs electricity from the at least one additional energy source to the rechargeable battery at selective times when the rechargeable battery is not supplying electricity to the plurality of electrically powered devices.

20 Claims, 2 Drawing Sheets

(51) Int. Cl.
   *H02J 9/00* (2006.01)
   *H02J 9/06* (2006.01)
   *H02J 7/34* (2006.01)
   *H02J 7/00* (2006.01)

(58) Field of Classification Search
   CPC ... H02J 1/10; G01R 11/56; B60K 6/22; B60K 6/00; G07B 15/00; G07B 15/02
   USPC ..... 307/10.1, 9.1, 10.6, 80, 43, 82; 320/109, 320/108, 110, 132, 128; 700/291, 297, 700/286
   See application file for complete search history.

(56) References Cited

U.S. PATENT DOCUMENTS

| | | | |
|---|---|---|---|
| 5,256,502 A | 10/1993 | Kump | |
| 5,283,513 A | 2/1994 | Fujita et al. | |
| 5,306,999 A | 4/1994 | Hoffman | |
| 5,323,099 A | 6/1994 | Bruni et al. | |
| 5,341,083 A | 8/1994 | Klontz et al. | |
| 5,346,786 A | 9/1994 | Hodgetts | |
| 5,369,353 A | 11/1994 | Erdman | |
| 5,387,857 A | 2/1995 | Honda | |
| 5,393,617 A | 2/1995 | Klein | |
| 5,395,708 A | 3/1995 | Hall | |
| 5,429,643 A | 7/1995 | Lund et al. | |
| 5,490,572 A | 2/1996 | Tajiri et al. | |
| 5,524,681 A | 6/1996 | Davies et al. | |
| 5,538,809 A | 7/1996 | Bittihn et al. | |
| 5,548,200 A | 8/1996 | Nor et al. | |
| 5,552,243 A | 9/1996 | Klein | |
| 5,563,491 A | 10/1996 | Tseng | |
| 5,594,318 A | 1/1997 | Nor et al. | |
| 5,765,656 A | 6/1998 | Weaver | |
| 5,909,099 A | 6/1999 | Watanabe et al. | |
| 6,362,594 B2 | 3/2002 | Kajiura | |
| 6,481,230 B2 | 11/2002 | Kimishima et al. | |
| 6,492,053 B1 | 12/2002 | Donelson et al. | |
| 6,887,620 B2 | 5/2005 | Klein et al. | |
| 6,914,414 B2 | 7/2005 | Hamada | |
| 6,930,410 B2 | 8/2005 | Ikeda et al. | |
| 7,109,684 B2 | 9/2006 | Takaoka et al. | |
| 7,163,761 B2 | 1/2007 | Debe et al. | |
| 7,248,018 B2 | 7/2007 | Sanders, Jr. et al. | |
| 7,256,516 B2 | 8/2007 | Buchanan et al. | |
| 7,498,770 B1 | 3/2009 | Caldwell | |
| 7,622,897 B2 | 11/2009 | Eberhard et al. | |
| 7,629,773 B2 | 12/2009 | Eberhard et al. | |
| 7,683,570 B2 | 3/2010 | Krauer et al. | |
| 7,683,582 B2 | 3/2010 | Zhu et al. | |
| 7,772,799 B2 | 8/2010 | Wu | |
| 7,791,314 B2 | 9/2010 | Bucur | |
| 7,940,028 B1 | 5/2011 | Hermann | |
| 8,013,569 B2 | 9/2011 | Hartman | |
| 8,013,571 B2 | 9/2011 | Agassi et al. | |
| 8,019,697 B2 | 9/2011 | Ozog | |
| 8,049,460 B2 | 11/2011 | Krauer et al. | |
| 8,098,044 B2 | 1/2012 | Taguchi | |
| 8,099,198 B2 | 1/2012 | Gurin | |
| 8,106,627 B1 | 1/2012 | Rossi | |
| 8,120,310 B2 | 2/2012 | Litterell et al. | |
| 8,288,986 B2 | 10/2012 | Flack | |
| 8,344,692 B2 | 1/2013 | Sakurai | |
| 8,450,966 B2 | 5/2013 | Krauer et al. | |
| 8,552,597 B2 * | 10/2013 | Song | H02J 1/102 307/149 |
| 8,692,506 B2 | 4/2014 | Saito et al. | |
| 8,725,330 B2 | 5/2014 | Failing | |
| 8,760,116 B2 | 6/2014 | Fujii | |
| 8,941,356 B2 | 1/2015 | Xu et al. | |
| 8,963,481 B2 | 2/2015 | Prosser et al. | |
| 9,000,724 B2 | 4/2015 | Minami | |
| 9,007,020 B2 | 4/2015 | Prosser et al. | |
| 9,422,922 B2 * | 8/2016 | Sant'Anselmo | H02J 3/38 |
| 2001/0002786 A1 | 6/2001 | Najima | |
| 2001/0003416 A1 | 6/2001 | Kajiura | |
| 2001/0049054 A1 | 12/2001 | Ecomoto et al. | |
| 2002/0136946 A1 | 9/2002 | Amatucci et al. | |
| 2003/0013009 A1 | 1/2003 | Dansui et al. | |
| 2004/0038123 A1 | 2/2004 | Hisamitsu et al. | |
| 2005/0089751 A1 | 4/2005 | Oogami et al. | |
| 2005/0111167 A1 | 5/2005 | Yamaguchi et al. | |
| 2005/0112430 A1 | 5/2005 | Nuttall et al. | |
| 2005/0167169 A1 | 8/2005 | Gering et al. | |
| 2005/0214638 A1 | 9/2005 | Asahina et al. | |
| 2005/0285563 A1 | 12/2005 | Yoneda | |
| 2006/0057433 A1 | 3/2006 | Ando et al. | |
| 2006/0121342 A1 | 6/2006 | Sano et al. | |
| 2006/0188776 A1 | 8/2006 | Aker et al. | |
| 2006/0219448 A1 | 10/2006 | Grieve et al. | |
| 2007/0015047 A1 | 1/2007 | Hosaka et al. | |
| 2007/0023078 A1 | 2/2007 | Palladino | |
| 2007/0024244 A1 | 2/2007 | Zhu et al. | |
| 2007/0026739 A1 | 2/2007 | Kim et al. | |
| 2007/0128472 A1 | 6/2007 | Tierney et al. | |
| 2007/0158574 A1 | 7/2007 | Petrillo et al. | |
| 2008/0070102 A1 | 3/2008 | Watanabe | |
| 2008/0070106 A1 | 3/2008 | Hock et al. | |
| 2008/0119965 A1 | 5/2008 | McCrary | |
| 2008/0211230 A1 | 9/2008 | Gurin | |
| 2008/0275600 A1 | 11/2008 | Rask et al. | |
| 2009/0062967 A1 * | 3/2009 | Kressner | B60L 11/14 700/286 |
| 2009/0139781 A1 | 6/2009 | Straubel | |
| 2009/0200987 A1 | 8/2009 | Saito et al. | |
| 2009/0239130 A1 | 9/2009 | Culver et al. | |
| 2009/0246596 A1 | 10/2009 | Sridhar et al. | |
| 2009/0256523 A1 | 10/2009 | Taguchi | |
| 2009/0305125 A1 | 12/2009 | Kosugi et al. | |
| 2009/0310308 A1 | 12/2009 | Lowell et al. | |
| 2010/0006356 A1 | 1/2010 | Curry et al. | |
| 2010/0088261 A1 | 4/2010 | Montalvo | |
| 2010/0089669 A1 | 4/2010 | Taguchi | |
| 2010/0104927 A1 | 4/2010 | Albright | |
| 2010/0119928 A1 * | 5/2010 | Yoon | H01M 2/10 429/120 |
| 2010/0134067 A1 | 6/2010 | Baxter et al. | |
| 2010/0138092 A1 | 6/2010 | Kohn | |
| 2010/0167116 A1 | 7/2010 | Okada | |
| 2010/0225475 A1 | 9/2010 | Karch et al. | |
| 2010/0241308 A1 * | 9/2010 | Kikuchi | B60H 1/00278 701/36 |
| 2010/0273044 A1 | 10/2010 | Culver et al. | |
| 2010/0315040 A1 | 12/2010 | Sakurai | |
| 2010/0324765 A1 | 12/2010 | Iida et al. | |
| 2011/0025267 A1 | 2/2011 | Kamen et al. | |
| 2011/0055037 A1 | 3/2011 | Hayashigawa et al. | |
| 2011/0074350 A1 | 3/2011 | Kocher | |
| 2011/0082598 A1 * | 4/2011 | Boretto | G06Q 10/06 700/291 |
| 2011/0115425 A1 | 5/2011 | Olsson | |
| 2011/0202418 A1 | 8/2011 | Kempton et al. | |
| 2011/0204720 A1 | 8/2011 | Ruiz | |
| 2011/0244350 A1 | 10/2011 | Okuyoshi et al. | |
| 2011/0245987 A1 * | 10/2011 | Pratt | H01M 10/44 700/295 |
| 2011/0260470 A1 | 10/2011 | Ahmadi | |
| 2011/0266996 A1 | 11/2011 | Sugano | |
| 2011/0267004 A1 | 11/2011 | Krauer et al. | |
| 2011/0316482 A1 | 12/2011 | Baxter et al. | |
| 2012/0005031 A1 | 1/2012 | Jammer | |
| 2012/0007542 A1 | 1/2012 | Jammer | |
| 2012/0013300 A1 | 1/2012 | Prosser et al. | |
| 2012/0025762 A1 * | 2/2012 | Lienkamp | B60L 3/0046 320/109 |
| 2012/0025777 A1 | 2/2012 | Xu et al. | |
| 2012/0041855 A1 | 2/2012 | Sterling et al. | |
| 2012/0043935 A1 | 2/2012 | Dyer et al. | |
| 2012/0043943 A1 | 2/2012 | Dyer et al. | |
| 2012/0074901 A1 | 3/2012 | Mohammed | |
| 2012/0088131 A1 | 4/2012 | Chung et al. | |
| 2012/0091804 A1 * | 4/2012 | Altonen | E06B 9/68 307/31 |

(56) References Cited

U.S. PATENT DOCUMENTS

| | | |
|---|---|---|
| 2012/0135634 A1 | 5/2012 | Gaul et al. |
| 2012/0146585 A1 | 6/2012 | Darcy |
| 2012/0212174 A1 | 8/2012 | Ishikawa et al. |
| 2012/0249065 A1* | 10/2012 | Bissonette ............ B60L 11/184 320/109 |
| 2012/0299531 A1 | 11/2012 | Prosser et al. |
| 2012/0299544 A1 | 11/2012 | Prosser et al. |
| 2013/0002199 A1* | 1/2013 | Hu ........................ H02J 7/0004 320/112 |
| 2013/0029193 A1* | 1/2013 | Dyer .................... H01M 10/486 429/62 |
| 2013/0069591 A1 | 3/2013 | Iyasu et al. |
| 2013/0169038 A1* | 7/2013 | King .................... H02J 7/0031 307/10.1 |
| 2014/0091748 A1 | 4/2014 | Hermann |
| 2014/0093760 A1 | 4/2014 | Hermann et al. |
| 2014/0203077 A1 | 7/2014 | Gadh et al. |
| 2014/0333261 A1 | 11/2014 | Oh et al. |

FOREIGN PATENT DOCUMENTS

| | | |
|---|---|---|
| DE | 102009030092 A1 | 12/2010 |
| FR | 2934087 A3 | 1/2010 |
| JP | 10223263 A | 8/1998 |
| JP | 2002171684 A | 6/2002 |
| JP | 2002233070 A | 8/2002 |
| JP | 2009143509 A | 7/2009 |
| WO | WO2007086495 A1 | 8/2007 |
| WO | WO2010132443 A1 | 11/2010 |
| WO | WO2013019336 | 2/2013 |
| WO | WO2013019989 | 2/2013 |

* cited by examiner

ENERGY BANKING SYSTEM AND METHOD USING RAPIDLY RECHARGEABLE BATTERIES

The present invention relates generally to an energy banking system and method and more specifically to an energy banking system and method using rapidly rechargeable batteries.

BACKGROUND

Military bases receive a vast majority of their power from outside assets such as the power grid and are accordingly substantially dependent on an aging civilian/commercial grid that may be vulnerable to disruption. Businesses, residences, government and other facilities also receive a vast majority of their power from an aging civilian/commercial grid.

SUMMARY OF THE INVENTION

A system for banking energy is provided. The system includes a rechargeable battery and a controller selectively controlling a supply of electricity from the rechargeable battery and from at least one additional energy source to a plurality of electrically powered devices of a facility. The controller directs electricity from the at least one additional energy source to the rechargeable battery at selective times when the rechargeable battery is not supplying electricity to the plurality of electrically powered devices.

BRIEF DESCRIPTION OF THE DRAWINGS

The present invention is described below by reference to the following drawings, in which.

DETAILED DESCRIPTION

Figure 1:
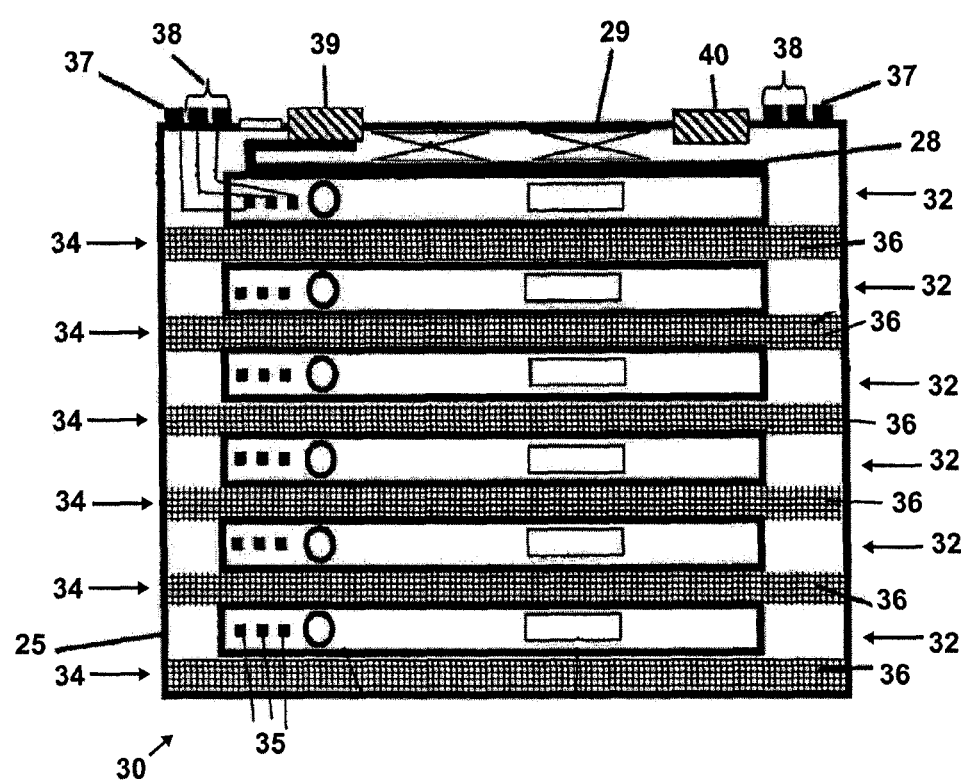
FIG. 1 shows one exemplary embodiment of a rechargeable electric battery for use in a system and method of the present invention.

Embodiments of the present invention involve using rechargeable backup batteries including advanced storage technology to store and dispense energy and power to electrical devices. In a preferred embodiment, the rechargeable backup battery is rechargeable electric battery 30 shown in FIG. 1 and is rechargeable by a rapid recharging system 98 of an energy banking system 100 shown in FIG. 2. The electrical input to the electrical devices may occur flexibly from the grid and/or renewable energy sources. Grid connections and battery units may be compatible with electric battery rapid recharging systems. A management system, which may be included in a controller 130 shown in FIG. 2 or an additional controller, may optimize recharging and utilization including optionally rapid recharging from the grid during off-peak periods and/or via renewable or others sources when they are best available. This feature of managing peak and off peak provides a cost arbitrage and may have many additional economic advantages described below.

In brief, the application of rapid recharging system 98 enables unique functionality and value on a cross-systems basis. Rather than backup batteries that are single purpose and solely for emergencies, the rechargeable backup batteries described herein are applied for greater economic and national security productivity. For example, the rechargeable backup batteries may provide a daily return on investment by enabling banking an utilization of electrical energy which takes advantage of electrical re-charging at high rates during lower cost (off peak) periods and allowing electrical devices grid-independent energy via the rechargeable backup batteries during otherwise higher cost (peak) periods.

The management system may include data inputs and dynamic management models in accord with a variety of considerations. For example, these parameters may include economic and operational parameters for the site, as well as more broadly for the surrounding area and region. Such decision management and decision making for example may be supported by an intelligent management system with data inputs ranging from weather and real-time operating conditions, to secure military and homeland security parameters on the needs for emergency readiness.

The advantages of such an approach may be considerable. Present practices may leave backup batteries to remain as unproductive or idle capital equipment except for emergencies, instead, according to the embodiments of the present invention the rechargeable backup batteries may be used for daily productive work.

As noted above, a primary benefit may occur by using the stored power to help balance loads and reduce operating costs—e.g., by charging at night when demand and cost is low and using the stored power to reduce use of the grid during peak periods when demand and price is high. There are other important benefits as described below.

The rechargeable backup batteries are an important enabler for such a system due to rapid recharge and long life advantages. These features may make such usage economically feasible and dynamically adjustable and fine tune-able for operating needs. The compactness and moveable configuration also provides further dynamic flexibility for availability of energy that is not necessarily fixed to any particular site and instead may be located as needed. Stored units also may be situated in secure areas in event of arriving storm or attack, later, for example, to be brought back above ground when needed.

The rechargeable backup batteries provide unique characteristics because there is substantial flexibility in their operating parameters and flexibility for deployment. The system may be operated under common control, where management system, geographic/site specific logistical data and risk management models/parameters collectively or individually may be used as inputs and to help drive output decisions—i.e., in determining the optimal balance of residual charged capacity (i.e., how much to retain on-hand for emergencies in each unit or across a network of units.) For example, 20% capacity may be kept charged at all times for emergency needs and 80% may be actively cycled on a daily basis. Additionally, real time information on demand frequency inputs for the user and/or for the available grid may be used to maintain and manage the best charge/discharge scenarios dynamically as needed. A dynamic model may be used to optimize such usage.

At times of greater need, such as a high national alert or pending major storm, the system may be rapidly recharged and maintained at 100% charge readiness unless/until deployed. The rapid recharging capability may offer unique value, functionality and flexibility.

Among other advantages, dynamic modeling and networking in cooperation with utility companies may help to implement real-time decisions for charging the systems back to full capacity. By distributing such nodes, other benefits may include supporting public utilities in keeping voltage and frequency stable and provide spinning reserves (meet sudden demands for power).

Among additional benefits, this technology and approach may provide a buffer for integration of renewable power such as wave, wind power, or solar by storing excess energy produced during optimal periods and putting it to utilization during other periods when the most valuable. This may help to stabilize unpredictable aspects of renewable energy.

Additional advantages may include the ability to enable scale-able nodes in across a range of different volumes and capabilities. These nodes or energy banks may be comprised of moveable and non-moveable units depending upon the needs and application. For instance, sizes of such units and their weight may be configured as standard moveable units—for example packaged in standard shipping container-sized housing which is trailerable on most roadways. Other modules may be sized for "carry on" for other portability.

Among further advantages, each of these units may be backward compatible where one may recharge or rapidly recharge the other, or provide a distributed recharge site for a plethora of ordinary applications ranging from armaments to telecommunications, from transportation, to whatever desired system. When each unit is depleted, its movability may enable a variety of appropriate choices for recharge. These choices, including geographic movement and choice of recharging modality, may be managed locally or through a secure management network.

If public utilities participated in distributing such systems they also may reduce the need to building certain additional generating plants to address peak demand. This may provide an important economic benefit more broadly.

For realizing such models, the long cycle life of the rechargeable backup batteries, helps to achieve cost-effectiveness and realization of the technology and vision described above. The rechargeable backup batteries show long cycles life, i.e., 10,000 utilizations.

FIG. 1 shows one exemplary embodiment of a rechargeable electric battery 30 for use in a system and method of the present invention. Electric vehicle battery 30 may be a modular battery including a plurality of planar battery cells 32 separated by a plurality of internal channels 34 in battery 30 in between cells 32. Channels 34 are preferably at least partially filled with porous compressible interconnectors 36, which act to provide an electrically-conducting interconnection between adjacent cells 32 while also allowing coolant to be passed through internal channels 34 between cells 32 to cool cells 32 during charging. Cells 32 each include a positive and a negative electrode, with the positive electrodes connecting to a positive terminal 39 and the negative electrodes connecting to a negative terminal 40.

Compressible interconnectors 36 may be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces while maintaining sufficient spacing for coolant to be passed through internal channels 34 to cool cells 32 during charging. In a preferred embodiment, interconnectors 36 may be porous, corrugated and highly conductive for faster and more efficient and laminar cooling. In the illustrative example in FIG. 1, six cells 32 are contained in a stacked array within an enclosure 25 which, in this embodiment, is of rectangular cross section. Although only six cells 32 are shown, battery 30 may include more than thirty cells 32 and may include a hundred to hundreds of cells 32 interconnected to make a very high-voltage battery stack. Enclosure 25 includes inputs and outputs, which may be automatically opened or closed, allowing coolant to be passed through channels 34.

In alternative embodiments, interconnectors 36 may not be electrically and/or thermally conductive, but may simply be provided between cells 32 to space cells 32 apart from each other to form channels 34 between cells. In these embodiments, cells 32 may be formed as insulating pouches with conductive tabs at the ends thereof which allow coolant passing through channels 34 formed by interconnectors 36 to cool cells 32.

The power terminals 39, 40 connect internally to the ends of the cell module battery stack through an internal power bus 31 for the positive terminal 39 and electrically conductive enclosure 25 may serves as a negative bus 29 to negative terminal 40 or a negative bus may additionally be provided for negative terminal 40. Enclosure 25 may be provided with external multipin connectors 37, 38, which may be electrically connected by sense lines to electrical feed throughs 35, for monitoring cell voltage and cell temperature, respectively. One set of multipin connectors 37, 38 may be provided for each cell 32. In order to provide cell voltage and cell temperature information for controlling the charging of battery 30, multipin connectors 37, 38 may transmit voltage and cell temperature measurements to a controller.

In preferred embodiments, battery 30 contains nanoscale particles which fundamentally allow for high charging rates. The nanoscale particles may be coated with a thin layer of carbon. For example, anodes of cells 32 may be formed of lithium titanium oxide (LTO) nanoparticles and cathodes of cells 32 may be formed of lithium iron phosphate (LFP) nanoparticles, such that battery 30 may be rapidly recharged at up to the 3 minute rate (i.e., 20C-rate) and may also cycle for many thousands of times. For example, the use of such nanoparticles in battery 30 when combined with the present invention which limits the temperature rise in battery 30 may allow battery 30 to be rapidly charged more than 10,000 times.

Figure 2:
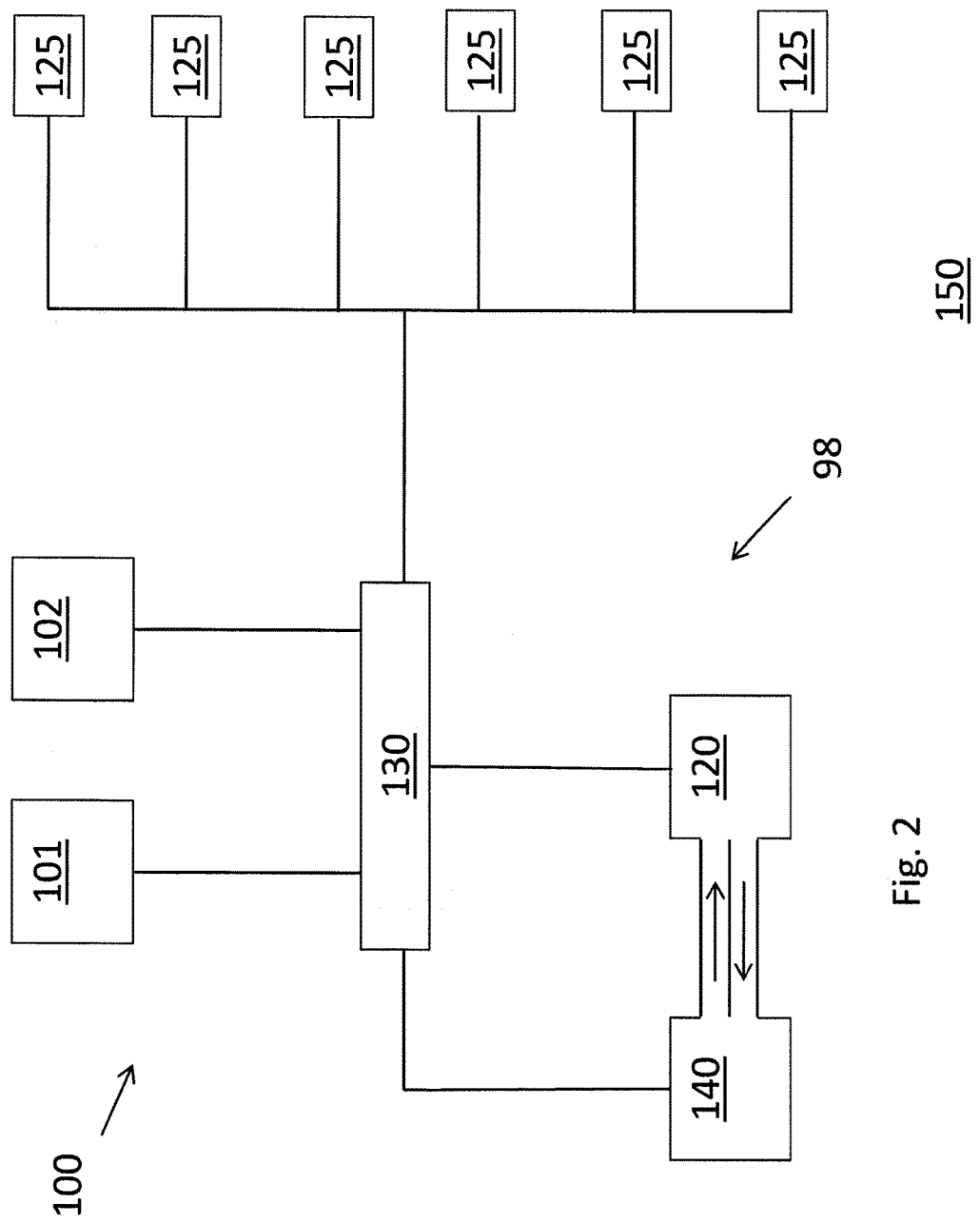
FIG. 2 schematically shows energy banking system according to an embodiment of the present invention.

FIG. 2 schematically shows energy banking system 100 according to an embodiment of the present invention. Energy banking system 100 includes a non-renewable energy source 101, which in a preferred embodiment is a grid connected to a power plant, a renewable energy source 102 and a rechargeable backup battery 120. In a preferred embodiment, rechargeable backup battery 120 is configured in the same manner as battery 30, but with substantially more cells 32. Source 101 and/or source 102 may be used to provide electricity to a plurality of electrically powered devices 125 of a facility 150, which may be a military base, one or more businesses, one or more residences or one of more government buildings. Rechargeable backup 120 may also be used to provide electricity to electrically powered devices 125, in the event of failure of sources 101, 102, for example due to an emergency, or based on other conditions as determined by a management system, which may be included in controller 130 or an additional controller. For example, during off peak power consumption periods, battery 120 may be connected to one of sources 101, 102 to rapidly recharge battery 120 as directed by controller 130 or manually. A cooling apparatus 140 may allow for battery 120 to be charged at high rates by sources 101, 102 by supplying coolant to channels 34 (FIG. 1) of battery 120 as sources 101, 102 charge battery 120. Controller 130 may control the rate of coolant supply from cooling apparatus 140 to battery 120, the rate of charging of battery 120 by sources 101, 102 and whether source 101, source 102 or battery 120 is supplying electricity to electrically powered devices 125. Battery 120, cooling apparatus 140 and an energy source, which may be one of energy sources 101, 102 or another energy source, along with controller 130 may define a rapid recharging system 98.

Coolant supplied by cooling apparatus 140 may be oil, water or air. For example, flowable liquid or gaseous materials having optimal heat capacity may be used. The coolant may be supplied with additives to increase heat exchange capabilities. In one preferred embodiment, the coolant is electrically insulating. In one preferred embodiment, the coolant is a commercial heat-transfer fluid, Paratherm LR, a paraffinic hydrocarbon with a broad operating range (i.e., between −50 and 230 degrees Celsius).

Energy banking system 100 may serve dual purposes of backup event of emergencies, and daily basis storing also for reducing peak power usage from the grid, thereby also reducing risks of capacity overload and reducing operating costs. Such energy banking also optionally include movable modules/nodes, which may include rechargeable backup battery 120 and optionally cooling apparatus 140 and controller 130, to overcome unpredictable disruption sites and enable strategic and tactical geographical/site support.

Secure management systems would integrate multivariable information across sources of electrical energy input and user needs. This information would dynamically model and manage state of readiness along with utilization for economic and other considerations.

The movable nodes may be extensively scalable for different types and scales of applications, for example:
  (A) standard single shipping container comprising 1172 cubic feet, 30,000 lbs, providing 1 MegaWatt hour;
  (B) "carry on sized" valise on wheels, 50-200 lbs, providing 7-30 KiloWatt Hr; and
  (C) network of 100 standard single shipping containers on trailer wheels, comprising 1172 cubic feet each, 30,000 lbs each, providing cumulative 100 Megawatt hrs.

Rapidly rechargeable/dischargeable nodes could be used as flexible stationary nodes, movable nodes to locate where/when needed, or like a fire brigade model to access recharge energy and shuttle one-by-one to where needed.

Rechargeable backup battery 120 and controller 130 may be readily connected with renewable and other sources, e.g., solar, wind, cogen, other, since predictability of these sources can be sensitive to the season, weather and time of day. Rechargeable backup battery 120 may also be operated daily, which is feasible to battery 120 having a long cycle life enabling 10,000 utilizations.

Rechargeable backup batteries 120 may allow for rapid recharge/discharge potential, as the application needs. For example:
  (A) akin to fire brigade model where energy or units are passed in a battery-to-battery transfer across a distance; and
  (B) in accord with intelligent management based upon risk modeling and utilization/demand.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A system for banking energy comprising:
  a rechargeable battery;
  a controller configured for selectively controlling a supply of electricity from the rechargeable battery and from at least one additional energy source to a plurality of electrically powered devices of a facility, the controller directing electricity from the at least one additional energy source to the rechargeable battery at selective times when the rechargeable battery is not supplying electricity to the plurality of electrically powered devices; and
  a cooling apparatus configured for supplying coolant to the rechargeable battery when the at least one additional energy source is recharging the rechargeable battery and supplying electricity to the plurality of electrically powered devices of the facility,
  wherein the rechargeable battery includes a plurality of channels having interconnectors provided therein, the coolant being passed through the interconnectors during the recharging of the rechargeable battery.

2. The system as recited in claim 1 wherein the controller controls a rate of coolant supply from the cooling apparatus to the rechargeable battery and a rate of electricity supplied to the rechargeable battery.

3. The system as recited in claim 1 wherein the at least one additional energy source includes a power grid and the controller controls the supply of electricity such that the rechargeable battery supplies energy to the plurality of electrically powered devices during a peak period of demand of the power grid and the power grid supplies energy to the plurality of electrically powered devices during an off-peak period of demand of the power grid,
  wherein the controller directs electricity from the power grid to the rechargeable battery during an off-peak period of demand of the power grid.

4. The system as recited in claim 1 wherein the at least one energy source includes a renewable energy source.

5. The system as recited in claim 1 wherein the controller selectively controls the rechargeable battery and the at least one energy source such that the rechargeable battery supplies energy to the plurality of electrically powered devices during emergencies when the at least one additional energy source is out of service.

6. The system as recited in claim 1 wherein the controller selectively controls the supply of electricity from the rechargeable battery and from at least one additional energy source to a plurality of electrically powered devices by alternately electrically connecting and electrically disconnecting the at least one energy source and the rechargeable battery to and from the plurality of electrically powered devices.

7. The system as recited in claim 6 wherein the controller alternately electrically connects and electrically disconnects the at least one energy source and the rechargeable battery to and from the plurality of electrically powered devices based on data inputs and dynamic management models of at least one parameter, wherein the at least one parameter is cost or includes operational parameters for the facility including real-time operating conditions.

8. The system as recited in claim 6 wherein the controller alternately electrically connects and electrically disconnects the at least one energy source and the rechargeable battery to and from the plurality of electrically powered devices based on data inputs and dynamic management models of at least one parameter, wherein the at least one parameter includes at least one of current or predicted weather parameters, military parameters and homeland security parameters.

9. The system as recited in claim 6 wherein the controller alternately electrically connects and electrically disconnects the at least one energy source and the rechargeable battery to and from the plurality of electrically powered devices based on data inputs and dynamic management models of at least one parameter, wherein the at least one parameter includes an optimal balance of residual charge capacity of the rechargeable battery.

10. The system as recited in claim 6 wherein the controller alternately electrically connects and electrically disconnects the at least one energy source and the rechargeable battery to and from the plurality of electrically powered devices based on data inputs and dynamic management models of at least one parameter, wherein the at least one energy source includes a power grid and the at least one parameter includes at least one of real-time information on demand frequency inputs for the facility and demand frequency inputs for the power grid.

11. A system for banking energy comprising:
a rechargeable battery; and
a controller configured for selectively controlling a supply of electricity from the rechargeable battery and from at least one additional energy source to a plurality of electrically powered devices of a facility, the controller directing electricity from the at least one additional energy source to the rechargeable battery at selective times when the rechargeable battery is not supplying electricity to the plurality of electrically powered devices,
wherein the rechargeable battery and the controller are formed as a movable node, the rechargeable battery including a plurality of battery cells in a stacked array and interconnectors spacing the battery cells from each other to define channels between the battery cells, the rechargeable battery further includes inputs and outputs allowing coolant to be passed through channels.

12. The system as recited in claim 11 further comprising a cooling apparatus supplying coolant to the channels of the rechargeable battery when the at least one additional energy source is supplying electricity to the plurality of electrically powered devices, the cooling apparatus being included in the movable node.

13. The system as recited in claim 1 wherein the coolant is liquid coolant passed through the channels formed in the rechargeable battery.

14. The system as recited in claim 1 wherein the interconnectors are porous and compressible.

15. The system as recited in claim 14 wherein the rechargeable battery includes a plurality of cells spaced apart from each other by the porous compressible interconnectors.

16. The system as recited in claim 15 wherein the porous compressible interconnectors electrically connect the cells to each other.

17. The system as recited 15 wherein the porous compressible interconnectors are made of a wire mesh, metal or carbon fibers retained in a compressible elastomeric matrix, or an interwoven conducting mat.

18. The system as recited in claim 11 wherein the interconnectors electrically connect the cells to each other.

19. The system as recited in claim 11 wherein the interconnectors are compressible.

20. The system as recited 19 wherein the interconnectors are made of a wire mesh, metal or carbon fibers retained in a compressible elastomeric matrix, or an interwoven conducting mat.

* * * * *